(12) United States Patent
Jousset et al.

(10) Patent No.: US 10,280,295 B2
(45) Date of Patent: May 7, 2019

(54) THERMOPLASTIC COMPOSITION MADE OF POLYPROPYLENE AND POLYAMIDE-GRAFTED POLYOLEFIN

(71) Applicant: Arkema France, Colombes (FR)

(72) Inventors: Dominique Jousset, Bougival (FR); Grégoire Aussedat, Paris (FR); Stéphane Bizet, Barc (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/109,460

(22) PCT Filed: Dec. 15, 2014

(86) PCT No.: PCT/FR2014/053339
§ 371 (c)(1),
(2) Date: Jul. 1, 2016

(87) PCT Pub. No.: WO2015/101730
PCT Pub. Date: Jul. 9, 2015

(65) Prior Publication Data
US 2016/0333173 A1  Nov. 17, 2016

(30) Foreign Application Priority Data

Jan. 3, 2014 (FR) ..................... 14 50031

(51) Int. Cl.
| | | |
|---|---|---|
| *C08L 23/12* | (2006.01) | |
| *C08L 23/10* | (2006.01) | |
| *C08L 51/06* | (2006.01) | |
| *C08L 23/08* | (2006.01) | |

(52) U.S. Cl.
CPC ............ *C08L 23/12* (2013.01); *C08L 23/08* (2013.01); *C08L 23/10* (2013.01); *C08L 51/06* (2013.01)

(58) Field of Classification Search
CPC ..................................................... C08L 23/12
See application file for complete search history.

(56) References Cited

U.S. PATENT DOCUMENTS

| | | | |
|---|---|---|---|
| 3,963,799 A | 6/1976 | Starkweather, Jr. | |
| 3,976,720 A | 8/1976 | Hammer et al. | |
| 5,342,886 A | 8/1994 | Glotin et al. | |
| 2003/0199635 A1 | 10/2003 | Court et al. | |
| 2010/0270820 A1* | 10/2010 | Hert ................ | C08F 255/00 296/37.8 |

FOREIGN PATENT DOCUMENTS

| | | |
|---|---|---|
| EP | 0 272 695 A2 | 6/1988 |
| EP | 0 472 344 A | 2/1992 |
| EP | 2 196 489 A1 | 6/2010 |
| FR | 2 291 225 A1 | 6/1976 |
| FR | 2 912 150 A1 | 8/2008 |
| FR | 2 918 150 A1 | 1/2009 |
| FR | 2 918 380 A1 | 1/2009 |
| JP | S631168455 A | 7/1988 |
| JP | H04183733 A | 6/1992 |
| JP | H05262930 A | 10/1993 |
| JP | 2004510865 A | 4/2004 |
| JP | 2010531909 A | 9/2010 |
| WO | WO 02/28959 A1 | 4/2002 |
| WO | WO 2006/085007 A1 | 8/2006 |

OTHER PUBLICATIONS

International Search Report (PCT/ISA/210) dated Feb. 19, 2015, by the French Patent Office as the International Searching Authority for International Application No. PCT/FR2014/053339.
Office Action (Notice of Reasons for Rejection) dated Jul. 31, 2018, by the Japanese Patent Office in corresponding Japanese Patent Application No. 2016-5444464, and an English Translation of the Office Action. (19 pages).

\* cited by examiner

*Primary Examiner* — Arrie L Reuther
(74) *Attorney, Agent, or Firm* — Buchanan Ingersoll & Rooney P.C.

(57) ABSTRACT

A composition of a blend of polypropylene, which may be present at between 10% and 90% by weight of the blend, and a polymer having a polyolefin core and polyamide grafts, optionally with an EPDM and/or a functional additive, which may be present at between 10% and 90% by weight of the blend. Also, a multilayer structure including a plurality of adjacent layers, at least one of which is the aforementioned composition.

10 Claims, No Drawings

THERMOPLASTIC COMPOSITION MADE OF POLYPROPYLENE AND POLYAMIDE-GRAFTED POLYOLEFIN

FIELD OF THE INVENTION

A subject matter of the invention is a thermoplastic composition based on polypropylene and on a polyamide-grafted polyolefin, the blend ideally being nanostructured. More particularly, the composition according to the invention comes in two alternative forms: in one, the polypropylene content is very high (≥60%) and, in the other, conversely, the polyamide-grafted polyolefin content is very high (≥50%).

The invention also relates to a multilayer structure in which at least one of the layers consists of the composition according to the invention.

STATE OF THE ART

A description is given, in the document WO 02/28959 of a grafted copolymer comprising polyamide blocks on a polyolefin backbone which is chosen from ethylene/maleic anhydride and ethylene/alkyl (meth)acrylate/maleic anhydride copolymers, forming a nanostructured cocontinuous alloy; this confers, on this terpolymer/copolymer, exceptional thermomechanical properties which are maintained on redispersing this grafted copolymer in flexible polyolefins, such as flexible ethylene polymers.

Such blends have applications such as adhesives, films, tarpaulins, calendered products, electric cables or powders for processes for the molding of objects ("slush molding"). In the document WO 2006/085007, such a composition was used to form a thermal protection layer of a substrate experiencing temperatures of greater than 150° Celsius (° C.).

These materials are said to be nanostructured, as defined in the two abovementioned patent documents, which confers on them advantageous properties with regard to their low levels of hardness (of between 82 and 95 Shore A) and their good thermomechanical behavior above the melting point of the polyolefin phase.

Unfortunately, these high performance compounds exhibit disadvantages when they are present in a large amount, namely when they form the matrix of a thermoplastic composition, and more particularly when this composition is required to display a degree of stiffness and also an absolute impermeability to water or a low moisture uptake.

When these same compounds are used in a low amount in a polyolefin matrix, it is unfortunately not obvious that they can confer an advantageous property on this matrix. One criterion is particularly important in certain applications: the creep. In point of fact, it has been found that the blend of these compounds with a polyethylene and more specifically a high density polyethylene (HDPE) is not very satisfactory from the viewpoint of this criterion of creep, in particular at temperatures of greater than 140° C. Such a thermoplastic composition is known from the document EP 2 196 489, filed on behalf of the applicant company.

Thus, it is not obvious to blend such a grafted copolymer comprising polyamide blocks on a polyolefin backbone with another polyolefin as the resulting composition very often exhibits poor physicochemical and stiffness properties.

Mention will also be made of the document FR 2 918 380, which discloses an attempt to blend the above said copolymer with two other polymers, including EPDMs (which do not have any reactive chemical functional group), but such a composition is flexible and exhibits a Young's modulus of less than 100 MPa (MegaPascal), which excludes this type of formulation from applications where a degree of stiffness is required. Furthermore, the properties of resistance to aging, in particular to UV radiation, of such a composition with EPDM are very mediocre. More specifically, example 2 disclosed in this document would not be resistant to creep as EPDM would not be crosslinked.

There is thus desired a thermoplastic composition with a grafted copolymer comprising polyamide blocks on a polyolefin backbone and a polyolefin which is simultaneously rigid and of ultra high performance in terms of mechanical and thermomechanical quality/property.

BRIEF DESCRIPTION OF THE INVENTION

The applicant has found, after various experiments and handling operations, that, contrary to the teachings well known to a person skilled in the art, a cocontinuous nanostructured composition comprising predetermined amounts of another polyolefin polymer exhibits, depending on the proportion of one with respect to the other, particularly improved creep properties or an excellent permeability to water, while retaining a high Young's modulus (stiffness) and very satisfactory physicochemical properties (in particular from the viewpoint of aging over time and damage by UV radiation).

Thus, the present invention relates to a thermoplastic composition consisting of a blend of polymers, consisting of:
- a first polymer consisting of polypropylene, present at between 10% and 90% by weight of the blend,
- a second polymer consisting of a polyolefin backbone containing a residue of at least one unsaturated monomer (X) and a plurality of polyamide grafts; the polyamide grafts are attached to the polyolefin backbone by the residue of the unsaturated monomer (X) comprising a functional group capable of reacting by a condensation reaction with a polyamide having at least one amine end and/or at least one carboxylic acid end and the residue of the unsaturated monomer (X) is attached to the backbone by grafting or copolymerization; this second polymer being present at between 10% and 90% by weight of the blend; and
- a third polymer consisting of a functionalized polyolefin, at between 0.1% and 20% of the blend; and
- optionally a functional adjuvant, at between 0% and 30% by weight of the composition; and
- in that the composition exhibits a Young's modulus at 23° C. of greater than or equal to 400 MPa.

Other advantageous characteristics of the invention are specified subsequently:
- advantageously, in the second polymer, the unsaturated monomer (X) is maleic anhydride,
- according to a particularly advantageous aspect of the invention, the above said grafted polymer, namely the above said second polymer, is nanostructured,
- preferably, regarding the second polymer, the number-average molar mass of the above said polyamide grafts of the above said grafted polymer is within the range extending from 1000 to 10 000 g/mol, preferably between 1000 and 5000 g/mol,
- preferably, relating to the second polymer, the polyamide grafts comprise at least one copolyamide, for example mono $NH_2$ 6/11, and/or one monofunctional $NH_2$ polyamide 6 and/or one monofunctional $NH_2$ polyamide 11, the first polymer is chosen from a polypropylene homopolymer or a heterogeneous or random polypropylene copolymer, advantageously, the above said first polymer is present at between 15% and 40% by weight of the composition while the second polymer is present at between 60% and 85% by weight of the composition, advantageously, the above said first polymer is present at between 60% and 90% by weight of the composition while the second polymer is present at between 10% and 40% by weight of the composition, the functional adjuvant consists of one or more plasticizers, adhesion promoters, UV stabilizers and/or UV absorbers, antioxidants, flame retardants, dyes/optical brighteners, pigments and reinforcing fillers.

The composition according to the invention is divided essentially into two parts depending on the proportion of polypropylene with respect to the polyamide-grafted polyolefin.

Thus, in the case where the amount of polypropylene is greater than or equal to 60% by weight of the blend, the polyamide-grafted polyolefin contributes to the composition, without damaging other properties/qualities, essentially but not exclusively, (very) good creep properties, in particular at temperatures greater than the melting point of the polypropylene, whereas, when it is the amount of polyamide-grafted polyolefin which is greater than 50% by weight of the blend, the polypropylene contributes to the composition, without damaging other properties/qualities, essentially but not exclusively, an excellent impermeability to water while retaining excellent creep resistance properties.

The invention also relates to a multilayer, such as in particular a back layer of a photovoltaic module or a cable coating (or also a gasoline tank, a fluid transportation tube comprising a plurality of adjacent layers), comprising a plurality of adjacent layers, characterized in that at least one of these layers consists of the composition as defined in any one of the preceding claims.

It should be noted that the composition according to the invention is presented in connection with the application to a photovoltaic module (due in particular to the excellent properties of creep and of impermeability to water and also to the specific mechanical properties required) but, of course, this composition can be envisaged for any other application where such a composition can advantageously be used, in particular in multilayer structures, such as, for example, cables (in particular tubes for the transportation of air or fluid), footwear (for example skis), films or adhesive coatings.

DETAILED DESCRIPTION OF THE INVENTION

As regards a first polymer, it consists of polypropylene; it is a polypropylene homo- or copolymer.

Mention may be made, as comonomers, of:

α-olefins, advantageously those having 3 to 30 carbon atoms. Examples of such α-olefins are the same as those cited for the second polymer (description given below), except for replacing propylene by ethylene in the list, dienes.

The second polymer can also be a copolymer comprising polypropylene blocks.

Mention may be made, as examples of polymer, of:
polypropylene,
blends of polypropylene and of EPDM (ethylene propylene diene monomer) or of EPR (ethylene propylene rubber), well known to a person skilled in the art, which can additionally contain from 1% to 20% of polyethylene.

As regards the polyolefin backbone of the second polyamide-grafted polymer, this is a polymer comprising an α-olefin as monomer.

Preference is given to α-olefins having from 2 to 30 carbon atoms.

Mention may be made, as α-olefin, of ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene.

Mention may also be made of cycloolefins having from 3 to 30 carbon atoms, preferably from 3 to 20 carbon atoms, such as cyclopentene, cycloheptene, norbornene, 5-methyl-2-norbornene, tetracyclododecene and 2-methyl-1,4:5,8-dimethano-1,2,3,4,4a,5,8,8a-octahydronaphthalene; di- and polyolefins, such as butadiene, isoprene, 4-methyl-1,3-pentadiene, 1,4-pentadiene, 1,5-hexadiene, 1,3-hexadiene, 1,3-octadiene, 1,4-octadiene, 1,5-octadiene, 1,6-octadiene, ethylidenenorbornene, vinylnorbornene, dicyclopentadiene, 7-methyl-1,6-octadiene, 4-ethylidene-8-methyl-1,7-nonadiene and 5,9-dimethyl-1,4,8-decatriene; vinylaromatic compounds, such as mono- or polyalkylstyrenes (comprising styrene, o-methylstyrene, m-methylstyrene, p-methylstyrene, o,p-dimethylstyrene, o-ethylstyrene, m-ethylstyrene and p-ethylstyrene) and derivatives comprising functional groups, such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene, α-methylstyrene, vinyl chloride, 1,2-difluoroethylene, 1,2-dichloro-ethylene, tetrafluoroethylene and 3,3,3-trifluoro-1-propene.

In the context of the present invention, the term of α-olefin also comprises styrene. Preference is given to propylene and very especially to ethylene as α-olefin.

This polyolefin can be a homopolymer when just one α-olefin is polymerized in the polymer chain. Mention may be made, as examples, of polyethylene (PE) or polypropylene (PP).

This polyolefin can also be a copolymer when at least two comonomers are copolymerized in the polymer chain, one of the two comonomers, referred to as "first comonomer", being an α-olefin and the other comonomer, referred to as "second comonomer", being a monomer capable of polymerizing with the first comonomer.

Mention may be made, as second comonomer, of:
one of the α-olefins already mentioned, this being different from the first α-olefin comonomer,
dienes, such as, for example, 1,4-hexadiene, ethylidenenorbornene or butadiene,
esters of unsaturated carboxylic acids, such as, for example, alkyl acrylates or alkyl methacrylates, combined under the term alkyl (meth)acrylates. The alkyl chains of these (meth)acrylates can have up to 30 carbon atoms. Mention may be made, as alkyl chains, of methyl, ethyl, propyl, n-butyl, sec-butyl, isobutyl, tert-butyl, pentyl, hexyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, hencosyl, docosyl, tricosyl, tetracosyl, pentacosyl, hexacosyl, heptacosyl, octacosyl or nonacosyl. Preference is given to methyl, ethyl and butyl (meth)acrylates as esters of unsaturated carboxylic acids, vinyl esters of carboxylic acids. Mention may be made, as examples of vinyl esters of carboxylic acids, of vinyl acetate, vinyl versatate, vinyl propionate, vinyl butyrate or vinyl maleate. Preference is given to vinyl acetate as vinyl ester of carboxylic acid.

Advantageously, the polyolefin backbone comprises at least 50 mol % of the first comonomer; its density can advantageously be between 0.91 and 0.96.

The preferred polyolefin backbones consist of an ethylene/alkyl (meth)acrylate copolymer. By using this polyolefin backbone, an excellent resistance to aging due to light and to temperature is obtained.

It would not be departing from the scope of the invention if different "second comonomers" were copolymerized in the polyolefin backbone.

According to the present invention, the polyolefin backbone comprises at least one residue of an unsaturated monomer (X) which can react with an acid and/or amine functional group of the polyamide graft by a condensation reaction. According to the definition of the invention, the unsaturated monomer (X) is not a "second comonomer".

Mention may be made, as unsaturated monomer (X) included on the polyolefin backbone, of:
  unsaturated epoxides. These include, for example, aliphatic glycidyl esters and ethers, such as allyl glycidyl ether, vinyl glycidyl ether, glycidyl maleate, glycidyl itaconate, glycidyl acrylate and glycidyl methacrylate. These are also, for example, alicyclic glycidyl esters and ethers, such as 2-cyclohexen-1-yl glycidyl ether, diglycidyl cyclohexene-4,5-dicarboxylate, glycidyl cyclohexene-4-carboxylate, glycidyl 5-norbornene-2-methyl-2-carboxylate and diglycidyl endo-cis-bicyclo (2,2,1)hept-5-ene-2,3-dicarboxylate. Use is preferably made of glycidyl methacrylate as unsaturated epoxide,
  unsaturated carboxylic acids and their salts, for example acrylic acid or methacrylic acid and the salts of these acids,
  carboxylic acid anhydrides. They can be chosen, for example, from maleic anhydride, itaconic anhydride, citraconic anhydride, allylsuccinic anhydride, cyclohex-4-ene-1,2-dicarboxylic anhydride, 4-methylenecyclohex-4-ene-1,2-dicarboxylic anhydride, bicycle(2,2,1)hept-5-ene-2,3-dicarboxylic anhydride and x-methylbicyclo(2,2,1)hept-5-ene-2,2-dicarboxylic anhydride. It is preferable to use maleic anhydride as carboxylic acid anhydride.

The unsaturated monomer (X) is preferably an unsaturated carboxylic acid anhydride.

According to an advantageous version of the invention, the preferred number of unsaturated monomers (X) attached on average to the polyolefin backbone is greater than or equal to 1.3 and/or preferably less than or equal to 20.

Thus, if (X) is maleic anhydride and the number-average molar mass of the polyolefin is 15 000 g/mol, it has been found that this corresponds to a proportion of anhydride of at least 0.8% by mass of the whole of the polyolefin backbone and of at most 6.5%. These values, associated with the mass of the polyamide grafts, determine the proportion of the polyamide and of backbone in the polyamide-grafted polymer.

The polyolefin backbone comprising the residue of the unsaturated monomer (X) is obtained by polymerization of the monomers (first comonomer, optional second comonomer and optionally unsaturated monomer (X)). This polymerization can be carried out by a high pressure radical process or a solution process, in an autoclave or tubular reactor, these processes and reactors being well known to a person skilled in the art. When the unsaturated monomer (X) is not copolymerized in the polyolefin backbone, it is grafted to the polyolefin backbone. The grafting is also an operation known per se. The composition would be in accordance with the invention if several different functional monomers (X) were copolymerized and/or grafted to the polyolefin backbone.

According to the types and ratios of monomers, the polyolefin backbone may be semicrystalline or amorphous. In the case of amorphous polyolefins, only the glass transition temperature is observed whereas, in the case of semicrystalline polyolefins, a glass transition temperature and a melting point (which will necessarily be greater) are observed. It will be sufficient for a person skilled in the art to select the ratios of monomers and the molecular weights of the polyolefin backbone in order to be able to easily obtain the desired values of glass transition temperature, optionally of melting point and also of viscosity of the polyolefin backbone.

Preferably, the polyolefin has a melt flow index (MFI) of between 0.5 and 400 g/10 min (190° C., 2.16 kg, ASTM D 1238).

The polyamide grafts can either be homopolyamides or copolyamides.

Targeted in particular by the expression "polyamide grafts" are the aliphatic homopolyamides which result from the polycondensation:
  of a lactam,
  or of an aliphatic $\alpha,\omega$-aminocarboxylic acid,
  or of an aliphatic diamine and of an aliphatic diacid.

As examples of lactams, mention may be made of caprolactam, oenantholactam and lauryllactam.

As examples of aliphatic $\alpha,\omega$-aminocarboxylic acid, mention may be made of aminocaproic acid, 7-aminoheptanoic acid, 11-aminoundecanoic acid and 12-aminododecanoic acid.

As examples of aliphatic diamine, mention may be made of hexamethylenediamine, dodecamethylenediamine and trimethylhexamethylenediamine.

As examples of aliphatic diacid, mention may be made of adipic acid, azelaic acid, suberic acid, sebacic acid and dodecanedicarboxylic acid.

Among aliphatic homopolyamides, mention may be made, by way of example and without implied limitation, of the following polyamides: polycaprolactam (PA6); polyundecanamide (PA11, sold by Arkema under the Rilsan® brand); polylauryllactam (PA12, also sold by Arkema under the Rilsan® brand); polybutylene adipamide (PA4.6); polyhexamethylene adipamide (PA6.6); polyhexamethylene azelamide (PA6.9); polyhexamethylene sebacamide (PA6.10); polyhexamethylene dodecanamide (PA6.12); polydecamethylene dodecanamide (PA10.12); polydecamethylene sebacamide (PA10.10) and polydodecamethylene dodecanamide (PA12.12).

Also targeted by the expression "semicrystalline polyamides" are cycloaliphatic homopolyamides.

Mention may in particular be made of the cycloaliphatic homopolyamides which result from the condensation of a cycloaliphatic diamine and of an aliphatic diacid.

Mention may be made, as example of cycloaliphatic diamine, of 4,4'-methylenebis(cyclohexylamine), also known as bis(para-aminocyclohexyl)methane or PACM, or 2,2'-dimethyl-4,4'-methylenebis(cyclohexylamine), also known as bis(3-methyl-4-aminocyclohexyl)methane or BMACM.

Thus, mention may be made, among cycloaliphatic homopolyamides, of the polyamides PACM.12, resulting from the condensation of PACM with the $C_{12}$ diacid, and BMACM.10 and BMACM.12, resulting from the condensation of BMACM with the $C_{10}$ and $C_{12}$ aliphatic diacids respectively.

Also targeted by the expression "polyamide grafts" are the semi-aromatic homopolyamides which result from the condensation:
- of an aliphatic diamine and of an aromatic diacid, such as terephthalic acid (T) and isophthalic acid (I). The polyamides obtained are then commonly known as "polyphthalamides" or PPAs;
- of an aromatic diamine, such as xylylenediamine and more particularly meta-xylylenediamine (MXD), and of an aliphatic diacid.

Thus and without implied limitation, mention may be made of the polyamide 6.T, 6.I, MXD.6 or MXD.10.

The polyamide grafts brought into play in the composition according to the invention can also be copolyamides. The latter result from the polycondensation of at least two of the groups of monomers set out above for the production of homopolyamides. The term "monomer" in the present description of the copolyamides should be taken with the meaning of "repeat unit". This is because the case where a repeat unit of the PA consists of the combination of a diacid with a diamine is exceptional. It is considered that it is the combination of a diamine and of a diacid, that is to say the diamine/diacid pair (in an equimolar amount), which corresponds to the monomer. This is explained by the fact that, individually, the diacid or the diamine is only a structural unit, which is not sufficient in itself alone to polymerize to give a polyamide.

Thus, the copolyamides cover in particular the condensation products:
- of at least two lactams,
- of at least two aliphatic alpha, omega-aminocarboxylic acids,
- of at least one lactam and of at least one aliphatic alpha, omega-aminocarboxylic acid,
- of at least two diamines and of at least two diacids,
- of at least one lactam with at least one diamine and at least one diacid,
- of at least one aliphatic alpha, omega-aminocarboxylic acid with at least one diamine and at least one diacid, it being possible for the diamine(s) and the diacid(s) to be, independently of one another, aliphatic, cycloaliphatic or aromatic.

According to the types and ratios of monomers, the copolyamides can be semicrystalline or amorphous. In the case of the amorphous copolyamides, only the glass transition temperature is observed whereas, in the case of the semicrystalline copolyamides, a glass transition temperature and a melting point (which will necessarily be greater) are observed.

Among the amorphous copolyamides which can be used in the context of the invention, mention may be made, for example, of the copolyamides comprising semiaromatic monomers.

Among the copolyamides, use may also be made of semicrystalline copolyamides and in particular those of PA6/11, PA6/12 and PA6/11/12 type.

The degree of polymerization can vary within wide proportions; according to its value, it is a polyamide or a polyamide oligomer.

Advantageously, the polyamide grafts are monofunctional.

In order for the polyamide graft to have a monoamine ending, it is sufficient to use a chain-limiting agent of formula:

wherein:
$R_1$ is hydrogen or a linear or branched alkyl group comprising up to 20 carbon atoms,
$R_2$ is a linear or branched alkyl or alkenyl group having up to 20 carbon atoms, a saturated or unsaturated cycloaliphatic radical, an aromatic radical or a combination of the above. The chain-limiting agent can, for example, be laurylamine or oleylamine.

In order for the polyamide graft to have a monocarboxylic acid ending, it is sufficient to use a chain-limiting agent of formula $R'_1$—COOH or $R'_1$—CO—O—CO—$R'_2$ or a dicarboxylic acid.

$R'_1$ and $R'_2$ are linear or branched alkyl groups comprising up to 20 carbon atoms.

Advantageously, the polyamide graft has an end comprising an amine functionality. The preferred monofunctional polymerization chain-limiting agents are laurylamine and oleylamine.

The polyamide grafts have a molar mass of between 1000 and 10 000 g/mol, preferably of between 1000 and 5000 g/mol.

The polycondensation can be used to perform the grafting of the polyamide grafts and is carried out according to the processes normally known, for example at a temperature generally between 200 and 300° C., under vacuum or under an inert atmosphere, with stirring of the reaction mixture. The mean chain length of the graft is determined by the initial molar ratio of the polycondensable monomer or the lactam to the monofunctional polymerization chain-limiting agent. For the calculation of the mean chain length, one molecule of chain-limiting agent is normally allowed for one graft chain.

It will be sufficient for a person skilled in the art to select the types and ratios of monomers and also to choose the molar masses of the polyamide grafts in order to be able to easily obtain the desired values of glass transition temperature, optionally of melting point and also of viscosity of the polyamide graft.

The condensation reaction of the polyamide graft with the polyolefin backbone comprising the residue of X (or the functionalized monomer for the second grafted copolymer, namely the elastomer copolymer) is carried out by reaction of an amine or acid functional group of the polyamide graft with the X residue. Advantageously, monoamine polyamide grafts are used and amide or imide bonds are created by reacting the amine functional group with a functional group of the X residue.

This condensation is preferably carried out in the molten state. Conventional kneading and/or extrusion techniques can be used to manufacture the composition according to the invention. The components of the composition are thus blended to form a compounded product which can optionally be granulated at the die outlet. Advantageously, coupling agents are added during the compounding.

In order to obtain a nanostructured composition, the polyamide graft and the backbone can thus be blended in an extruder, at a temperature generally of between 200 and 300° C. The mean residence time of the molten material in the extruder can be between 5 seconds and 5 minutes and preferably between 20 seconds and 1 minute. The yield of this condensation reaction is evaluated by selective extraction of the free polyamide grafts, that is to say those which have not reacted to form the polyamide-grafted polymer.

The preparation of polyamide grafts comprising an amine end and also their addition to a polyolefin backbone comprising the residue of (X) or of a functionalized monomer (second copolymer) is described in the patents U.S. Pat. No. 3,976,720, U.S. Pat. No. 3,963,799, U.S. Pat. No. 5,342,886 and FR 2 291 225. The polyamide-grafted polymer of the present invention advantageously exhibits a nanostructured arrangement.

As regards the third optional polymer, it consists of a functionalized polyolefin capable of acting as agent for compatibilization between the polypropylene and the polyamide-grafted polyolefin. The description of this grafted polyolefin is similar to that of the polyolefin backbone used in the polyamide-grafted polyamide.

The expression "functional polyolefin" is understood to mean a polyolefin which includes, in its chain, one or more reactive chemical functional groups, such as conventionally epoxides, maleic acids and maleic anhydrides. This expression is well known to a person skilled in the art who is capable of identifying the polyolefins belonging or not belonging to this group. An EPDM does not correspond to this definition.

Advantageously, the functionalized polyolefin is a maleic anhydride-grafted polypropylene.

As regards the optional functional adjuvant, it can be present in the composition at a maximum content of 30% by weight of the composition and will be chosen solely from the compounds mentioned below or a mixture of these compounds.

Plasticizers can be added to the composition according to the invention in order to facilitate the processing and to improve the productivity of the process for manufacturing the composition and the structures. Mention will be made, as examples, of paraffinic, aromatic or naphthalenic mineral oils, which also make it possible to improve the adhesiveness of the composition according to the invention. Mention may also be made, as plasticizer, of phthalates, azelates, adipates or tricresyl phosphate.

In the same way, adhesion promoters, although not necessary, can advantageously be added in order to improve the adhesiveness of the composition when the adhesiveness has to be particularly high. The adhesion promoter is a nonpolymeric ingredient; it can be organic, crystalline, mineral and more preferably semi-mineral semi-organic. Mention may be made, among these, of organic silanes or titanates, such as, for example, monoalkyl titanates, trichlorosilanes and trialkoxysilanes, trialcooxysilanes. It will also be possible to provide for these adhesion promoters to be directly grafted to the first or the second copolymer by a technique well known to a person skilled in the art, for example via reactive extrusion.

As UV radiation is capable of resulting in a slight yellowing of the thermoplastic compositions, UV stabilizers and UV absorbers (these compounds being generally called UV inhibitors), such as benzotriazole, benzophenone and the other hindered amines, can be added in some applications where such a phenomenon has to be avoided. These compounds can, for example, be based on benzophenone or benzotriazole. They can be added in amounts of less than 10% by weight of the total weight of the composition and preferably from 0.1% to 5%.

It will also be possible to add antioxidants in order to limit the yellowing during the manufacture of the composition, such as phosphorus-comprising compounds (phosphonites and/or phosphites) and hindered phenolic compounds. These antioxidants can be added in amounts of less than 10% by weight of the total weight of the composition and preferably from 0.05% to 5%.

In the same way, in some applications, flame-retardant agents can also be added to the composition according to the invention. These agents may or may not be halogenated. Mention may be made, among halogenated agents, of brominated products. Use may also be made, as non-halogenated agent, of phosphorus-based additives, such as ammonium polyphosphate, aluminum phosphinates and phosphonates, melamine cyanurate, pentaerythritol, zeolites and the mixtures of these agents. The composition can comprise these agents in proportions ranging from 3% to 30%, with respect to the total weight of the composition. It will also be possible to add coloring or brightening compounds.

Pigments, such as, for example, titanium dioxide or zinc oxide, can also be added to the composition in proportions generally ranging from 5% to 15%, with respect to the total weight of the composition.

It is also possible to add reinforcing fillers, such as talc, glass fibers, carbon fibers, montmorillonites, carbon nanotubes or carbon black, to the composition in proportions generally ranging from 2.5% to 30%, with respect to the total weight of the composition.

Preparation of the Composition According to the Invention

As was mentioned above, the technique for grafting the polyamide grafts to the polyolefin backbone in order to obtain the polyamide-grafted polyolefin according to the invention is well known to a person skilled in the art, in particular from the abovementioned documents FR 2912150, FR 2918150 or EP 21966489.

The polypropylene, the functional adjuvant (abovementioned additive) and also the functionalized polyolefin are fully known to a person skilled in the art, and also the preparations thereof. The blending of these compounds is entirely conventional and does not require any specific explanation for a person skilled in the art.

It is thus not departing from the scope of the invention if crosslinking agents are added. Mention may be made, as examples, of organic peroxides or isocyanates. This crosslinking can also be carried out by known irradiation techniques. This crosslinking can be carried out by one of the many methods known to a person skilled in the art, in particular by the use of thermally activated initiators, for example peroxide and azo compounds, or photoinitiators, such as benzophenone, by radiation techniques comprising light rays, UV rays, electron beams and X rays, of silanes carrying reactive functional groups, such as an aminosilane, an epoxysilane or a vinylsilane, such as, for example, vinyltriethoxysilane or vinyltrimethoxysilane, and wet-route crosslinking. The handbook entitled "Handbook of Polymer Foams and Technology", supra, on pages 198 to 204, provides additional teaching to which a person skilled in the art may refer.

Materials Employed to Form the Test Formulations:

Lotader® 4210: terpolymer of ethylene, of ethyl acrylate (6.5% by weight) and of maleic anhydride (3.6% by weight) produced by Arkema, having an MFI (190° C. under 2.16 kg, measured according to ISO 1133) of 9 g/10 min.

PPH 4060: polypropylene homopolymer sold by Total, having an MFI (230° C. under 2.16 kg, measured according to ISO 1133) of 3 g/10 min.

PPC 3650: heterophasic polypropylene copolymer sold by Total, having an MFI (230° C. under 2.16 kg, measured according to ISO 1133) of 1.3 g/10 min.

Orevac® CA100: maleic anhydride-functionalized polypropylene sold by Arkema, having an MFI (190° C. under 0.325 kg, measured according to ISO 1133) of 10 g/10 min.

Talc HAR T77: sold by Imerys.

Glass fibers CSX 3J-451 WD: sold by Nittobo.

Titanium dioxide Kronos 2073: sold by Kronos.

TPV PP/crosslinked EPDM: thermoplastic elastomer consisting of 35% by weight of a polypropylene with an MFI (at 230° C. under 2.16 kg) of 2 g/10 min and of 65% by weight of a crosslinked EPDM with a system based on phenolic resin and comprising 150 phr of aliphatic oil. The exact composition of the EPDM is described in the composition of example 1 of the patent application FR 2 918 380.

HDPE M40053S: high-density polyethylene sold by SABIC company, having an MFI (190° C. under 2.16 kg, measured according to ISO 1133) of 4.0 g/10 min.

Polyamide prepolymer: mono $NH_2$ polyamide-6 prepolymer with an Mn of 2500 g/mol, produced by the applicant. This prepolymer was synthesized by polycondensation starting from lactam-6. Laurylamine is used as chain-limiting agent so as to have a single primary amine functionality at the chain end. The number-average molar mass of the prepolymer is 2500 g/mol.

Production of the Test Formulations and Films:

The formulations were prepared by "compounding" using a corotating twin-screw extruder of Leistritz® type (L/D=35), the barrel elements of which are heated according to a flat profile at 240° C.; the rotational speed is 300 rpm (rounds per minute) with a throughput of 15 kg/h (kilograms per hour).

350 μm (micrometer) monolayer films of the compositions were produced by cast film extrusion on a small laboratory extrusion line. The extruder is a counter-rotating twin-screw of Haake 1 type equipped with a flat die with a width of 10 cm (centimeters) and with an opening of 0.5 mm (millimeter). The barrel elements are heated according to a flat profile at 230° C., the rotational speed of the screws being 60 rpm (rounds per minute).

| Composition No. | Lotader® 4210 (% by weight of composition) | Prepolymer PA6 | PPH 4060 | PPC 3650 | Orevac® CA 100 | Glass fiber | Talc | Titanium dioxide |
|---|---|---|---|---|---|---|---|---|
| 1 | 57 | 25.5 | 10 | | 7.5 | | | |
| 2 | 50 | 22.5 | 20 | | 7.5 | | | |
| 3 | 49 | 21 | 22.5 | | 7.5 | | | |
| 4 | 42 | 18 | 32.5 | | 7.5 | | | |
| 5 | 35 | 15 | 42.5 | | 7.5 | | | |
| 6 | 28 | 12 | 52.5 | | 7.5 | | | |
| 7 | 21 | 9 | 62.5 | | 7.5 | | | |
| 8 | 14 | 6 | 72.5 | | 7.5 | | | |
| 9 | 7 | 3 | 82.5 | | 7.5 | | | |
| 10 | 49 | 21 | | 22.5 | 7.5 | | | |
| 11 | 42 | 18 | | 32.5 | 7.5 | | | |
| 12 | 42 | 18 | 32.5 | | 7.5 | | | |
| 13 | 39.9 | 17.1 | 30.5 | | 7.5 | 5 | | |
| 14 | 35 | 15 | 32.5 | | 7.5 | | 10 | |
| 15 | 35 | 15 | 32.5 | | 7.5 | | | 10 |

| Composition No. | Lotader® 4210 (% by weight of composition) | Prepolymer PA6 | PPH 4060 | HDPE | TPV PP/EPDM |
|---|---|---|---|---|---|
| 16 (comparative) | 66.5 | 28.5 | 5 | | |
| 17 (comparative) | 3.5 | 1.5 | 95 | | |
| 18 (comparative) | 70 | 30 | | | |
| 19 (comparative) | 50 | 30 | | 20 | |
| 20 (comparative) | 17.5 | 7.5 | | | 75 |

Tests Carried Out on the Films:

Three types of tests were mainly carried out on compositions 1 to 16 in order to test the resolution possibly of the abovementioned technical problems, but it should be noted that the compositions according to the invention furthermore exhibit other particularly advantageous properties.

These three tests consist, on the one hand, in measuring the Young's modulus at 23° C., expressed in MegaPascals (MPa), in measuring the permeability to water at ambient temperature and, finally, in determining the creep properties.

Test of the "Young's Modulus":

In order to measure the Young's modulus of the test specimens of compositions, a tensile test is carried out according to the standard NF EN ISO 527.

Test of Impermeability to Water:

This test is carried out with water vapor according to the standard ISO 1663 of 1999 (ex NF T 56-105), equivalent to the standard ASTM E96-80. This method gives a relative humidity content in the test specimen under consideration.

Creep Test:

The creep strength is determined from test specimens of IFC type cut out from the films. A weight is applied to one end of the test specimen corresponding to a stress of 2 bar, i.e. 0.2 MPa. The stress is applied for 15 minutes at a temperature of 150° C., 160° C. or 170° C., according to the composition. The residual strain is measured after returning to ambient temperature.

| Composition No. | Young's modulus (MPa) | Creep (strain in %) 150° C. | 160° C. | 170° C. | Permeability to water (g/m²/24 h) |
|---|---|---|---|---|---|
| 1 | 500 | | | 30 | 80 |
| 2 | 600 | | | 35 | 70 |
| 3 | 675 | | | 36 | 63 |
| 4 | 810 | | | 40 | 50 |
| 5 | 965 | | | 55 | 41 |
| 6 | 1140 | | | 85 | 24 |
| 7 | 1340 | | | 115 | 19 |
| 8 | 1565 | | | 195 | 15 |
| 9 | 1821 | | | 245 | 12 |
| 10 | 640 | | | 30 | 66 |
| 11 | 750 | | | 40 | 58 |
| 12 | 750 | | | 35 | 50 |
| 13 | 1260 | | | 35 | 56 |
| 14 | 1210 | | | 35 | 38 |
| 15 | 850 | | | 40 | 48 |
| 16 (comparative) | 415 | | | 25 | 90 |
| 17 (comparative) | 1951 | | | >300 | 12 |
| 18 (comparative) | 375 | 7.5 | 15 | 25 | 95 |
| 19 (comparative) | 2100 | | | >300 | 11 |
| 20 (comparative) | 510 | 10 | 45 | 100 | 70 |

The results for the three tests carried out on each of the compositions clearly show, on the one hand, the technical advantages of the composition according to the invention, although the latter are not in any way foreseeable, and, on the other hand, the preferred ranges (% by weight) for this composition.

The invention claimed is:

1. A thermoplastic composition consisting of a blend of polymers, consisting of:
   a first polymer consisting of polypropylene, present at between 10% and 90% by weight of the blend,
   a second polymer consisting of a polyolefin backbone containing a residue of at least one unsaturated monomer (X) and a plurality of polyamide grafts; the polyamide grafts are attached to the polyolefin backbone by the residue of the unsaturated monomer (X) comprising a functional group capable of reacting by a condensation reaction with a polyamide having at least one amine end and/or at least one carboxylic acid end and the residue of the unsaturated monomer (X) is attached to the backbone by grafting or copolymerization; this second polymer being present at between 10% and 90% by weight of the blend; and
   a third polymer consisting of a functionalized polyolefin, at between 0.1% and 20% of the blend; and
   optionally a functional adjuvant, at between 0% and 30% by weight of the composition; and
   in that the composition exhibits a Young's modulus at 23° C. of greater than or equal to 400 MPa.

2. The composition as claimed in claim 1, wherein in the second polymer, the unsaturated monomer (X) is maleic anhydride.

3. The composition as claimed in claim 1, wherein the said second polymer is nanostructured.

4. The composition as claimed in claim 1, wherein regarding the second polymer, the number-average molar mass of the above said polyamide grafts of the above said grafted polymer is within the range extending from 1000 to 10 000 g/mol.

5. The composition as claimed in claim 1, wherein regarding the second polymer, the polyamide grafts comprise at least one copolyamide, and/or one monofunctional $NH_2$ polyamide 6 and/or one monofunctional $NH_2$ polyamide 11.

6. The composition as claimed in claim 1, wherein the first polymer is chosen from a polypropylene homopolymer or a heterogeneous or random polypropylene copolymer.

7. The composition as claimed in claim 1, wherein the first polymer is present at between 15% and 40% by weight of the composition while the second polymer is present at between 60% and 85% by weight of the composition.

8. The composition as claimed in claim 1, wherein the first polymer is present at between 60% and 90% by weight of the composition while the second polymer is present at between 10% and 40% by weight of the composition.

9. The composition as claimed in claim 1, wherein the functional adjuvant consists of one or more plasticizers, adhesion promoters, UV stabilizers and/or UV absorbers, antioxidants, flame retardants, dyes/brighteners, pigments and reinforcing fillers.

10. A multilayer structure comprising a plurality of adjacent layers, wherein at least one of these layers consists of the composition as defined in claim 1.

* * * * *